United States Patent
Song

(10) Patent No.: US 8,086,962 B2
(45) Date of Patent: Dec. 27, 2011

(54) METHOD AND APPARATUS FOR REPRODUCING MULTIMEDIA FILES

(75) Inventor: Tae-Hyun Song, Seoul (KR)

(73) Assignee: LG Electronics Inc., Seoul (KR)

( * ) Notice: Subject to any disclaimer, the term of this patent is extended or adjusted under 35 U.S.C. 154(b) by 1485 days.

(21) Appl. No.: 11/538,424

(22) Filed: Oct. 3, 2006

(65) Prior Publication Data

US 2007/0089062 A1 Apr. 19, 2007

(30) Foreign Application Priority Data

Oct. 14, 2005 (KR) .................. 10-2005-0097133

(51) Int. Cl.
*G06F 17/00* (2006.01)

(52) U.S. Cl. ............. 715/731; 715/202; 707/E17.028

(58) Field of Classification Search .......... 715/731, 715/202, 747, 716, 810; 707/201, E17.028
See application file for complete search history.

(56) References Cited

U.S. PATENT DOCUMENTS

| | | | | |
|---|---|---|---|---|
| 4,841,506 | A * | 6/1989 | Kiyoura et al. | 369/178.01 |
| 6,766,357 | B1 * | 7/2004 | Fandozzi | 709/213 |
| 2001/0010663 | A1 * | 8/2001 | Nakazawa et al. | 369/2 |
| 2002/0103796 | A1 * | 8/2002 | Hartley | 707/4 |
| 2002/0112227 | A1 * | 8/2002 | Kramskoy et al. | 717/148 |
| 2003/0046638 | A1 * | 3/2003 | Thompson | 715/500 |
| 2003/0120654 | A1 * | 6/2003 | Edlund et al. | 707/7 |
| 2003/0135513 | A1 * | 7/2003 | Quinn et al. | 707/102 |
| 2003/0217170 | A1 * | 11/2003 | Nelson et al. | 709/231 |
| 2003/0221541 | A1 * | 12/2003 | Platt | 84/609 |
| 2004/0064476 | A1 * | 4/2004 | Rounds | 707/104.1 |
| 2004/0192306 | A1 * | 9/2004 | Elkarat et al. | 455/435.2 |
| 2004/0225519 | A1 * | 11/2004 | Martin | 705/1 |
| 2004/0253945 | A1 * | 12/2004 | Janik | 455/419 |
| 2005/0021470 | A1 * | 1/2005 | Martin et al. | 705/51 |
| 2005/0038819 | A1 * | 2/2005 | Hicken et al. | 707/104.1 |
| 2005/0210101 | A1 * | 9/2005 | Janik | 709/203 |
| 2006/0195516 | A1 * | 8/2006 | Beaupre | 709/203 |
| 2006/0218187 | A1 * | 9/2006 | Plastina et al. | 707/104.1 |
| 2007/0025194 | A1 * | 2/2007 | Morse et al. | 369/30.1 |
| 2007/0083897 | A1 * | 4/2007 | Brownell | 725/61 |

FOREIGN PATENT DOCUMENTS

KR  10-2002-0090023  11/2002

* cited by examiner

*Primary Examiner* — Stephen Hong
*Assistant Examiner* — Marshon Robinson
(74) *Attorney, Agent, or Firm* — Lee, Hong, Degerman, Kang & Waimey

(57) ABSTRACT

In the present invention, a method and apparatus are provided for reproducing multimedia files, wherein the selection probability of the multimedia files is adjusted according to a user's preference and a multimedia file is randomly selected and played according to the selection probability. The selection probability of the multimedia files is adjusted according to the user's preference; a user can listen to undesired multimedia files less frequently than other multimedia files even when the multimedia files are randomly selected.

18 Claims, 3 Drawing Sheets

<Fig. 1>
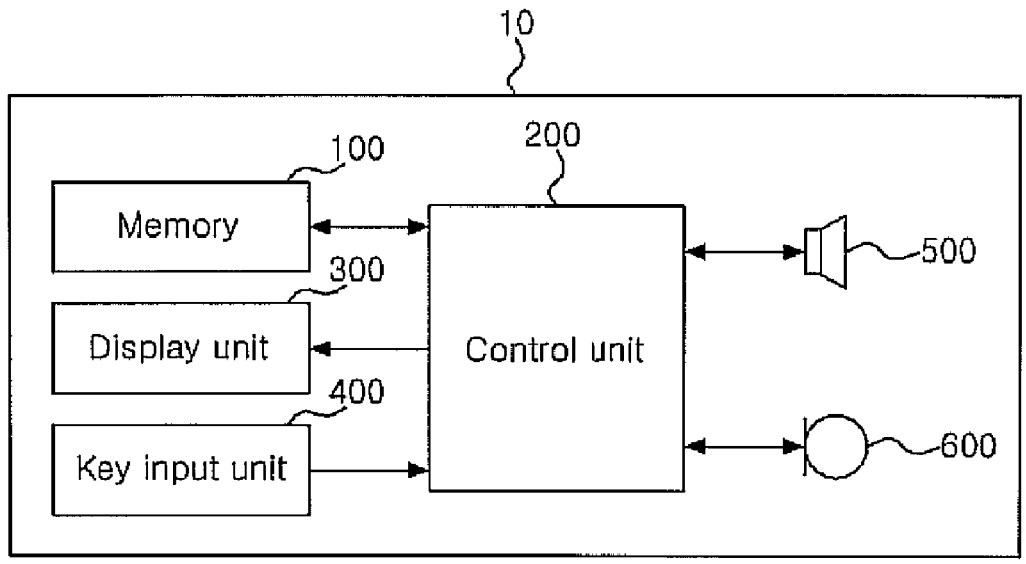
<Fig. 2>
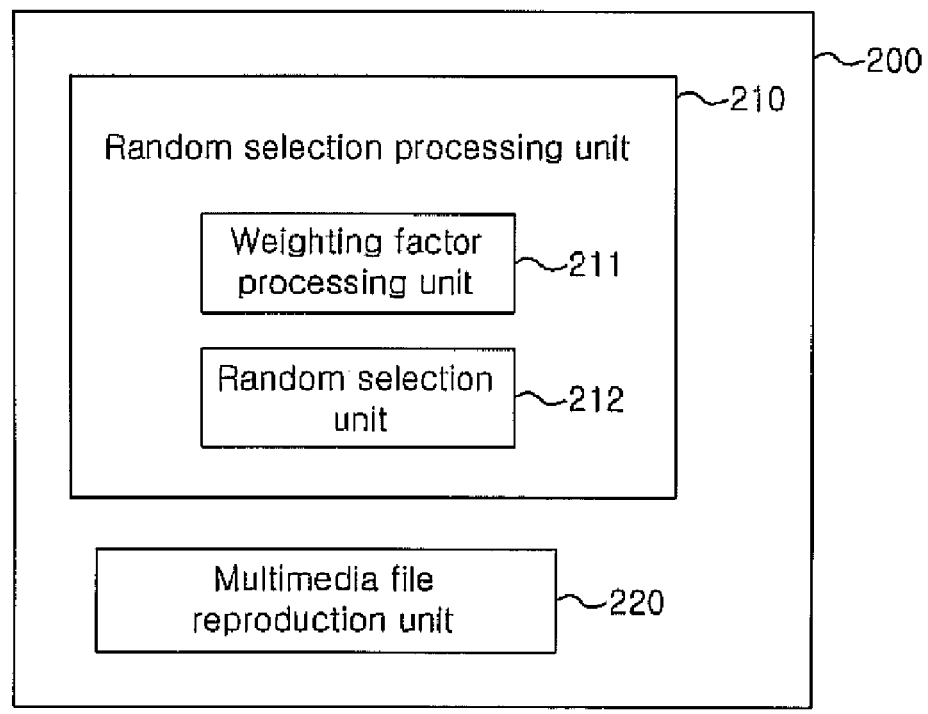

<Fig. 3>
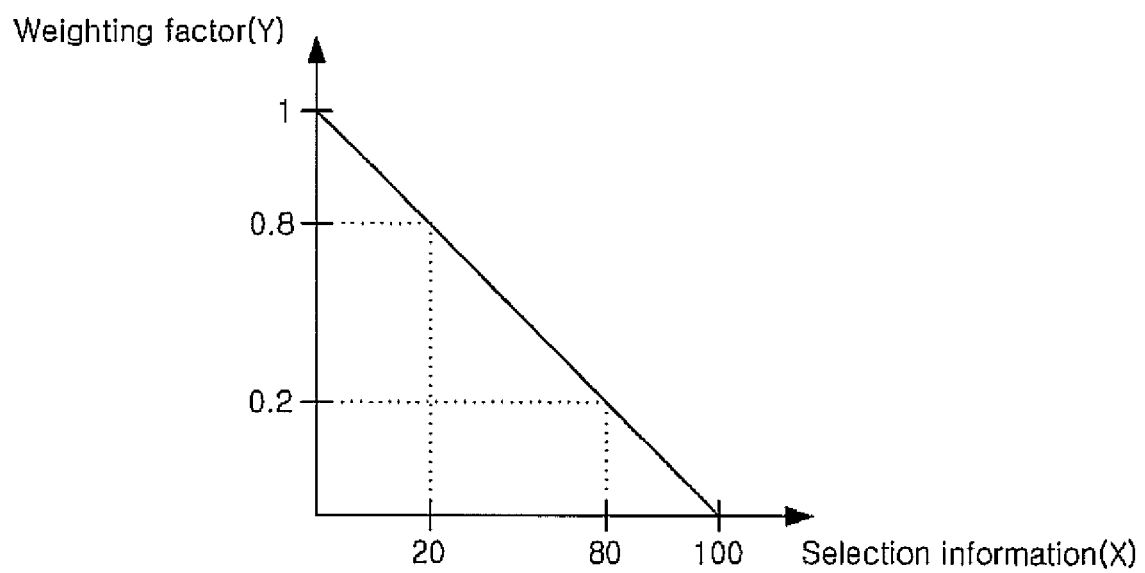

<Fig. 4>
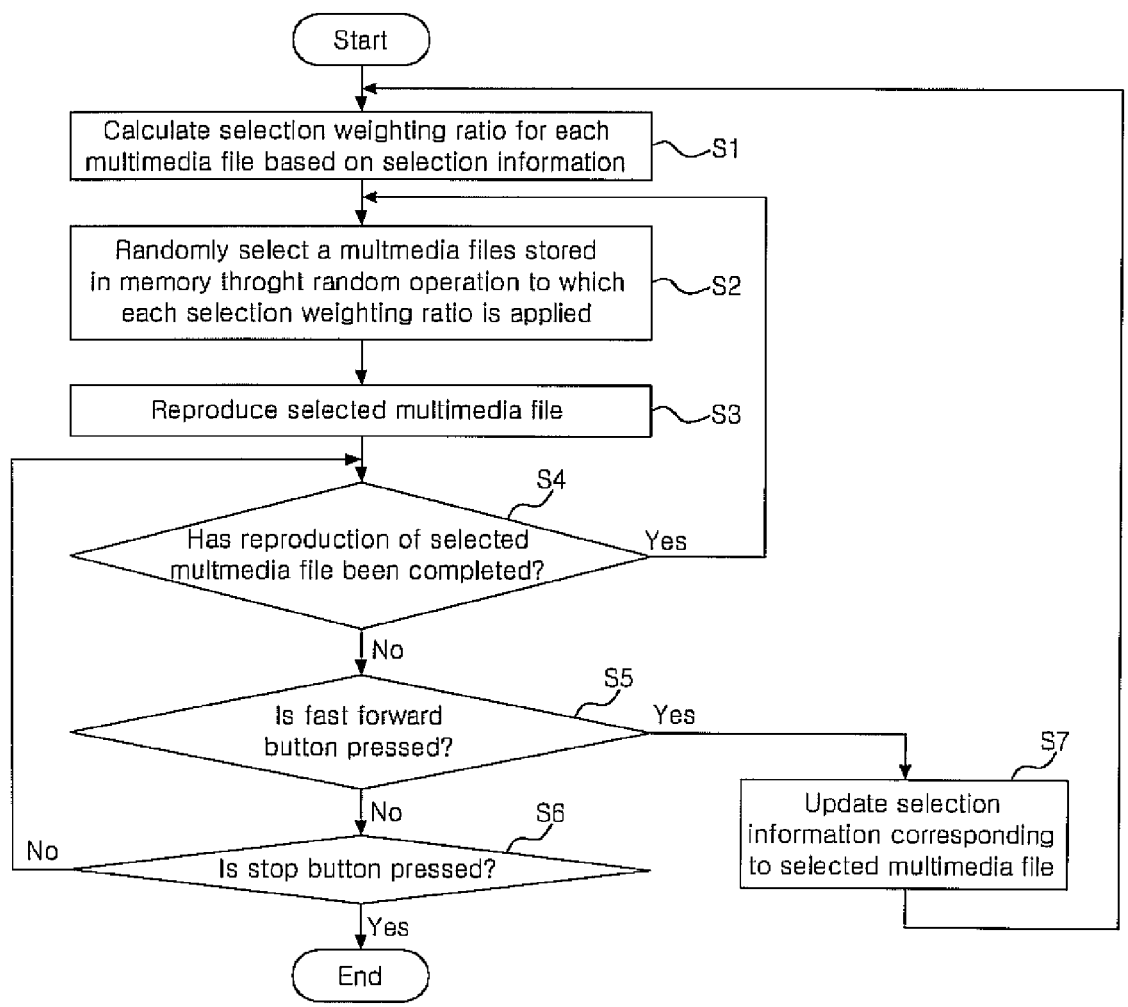

METHOD AND APPARATUS FOR REPRODUCING MULTIMEDIA FILES

CROSS REFERENCE TO RELATED APPLICATION

Pursuant to 35 U.S.C. §119(a), this application claims the benefit of earlier filing date and right of priority to Korean Application No. 10-2005-0097133, filed Oct. 14, 2005, the contents of which are hereby incorporated by reference herein in their entirety.

FIELD OF THE INVENTION

The present invention relates to a method and apparatus for reproducing or playing multimedia files, and more particularly, wherein the random selection probability of multimedia files for playing is adjusted in consideration of a user's preference.

DESCRIPTION OF THE RELATED ART

A conventional multimedia player may play multimedia files stored in memory using random selection wherein each multimedia file has an equal probability of being played. In such a random method, however, a multimedia file not preferred by a user is selected at the same probability as other multimedia files.

Accordingly, when a multimedia file is played that is that is not preferred by the user, the user presses a fast forward button or a stop button thereby allowing another multimedia file to be played.

The history of the multimedia files interrupted by the user is not stored in the player's memory. Therefore, the probability of unpreferred multimedia files being played is the same as any other multimedia file.

Accordingly, multimedia files need to be selected and played in a multimedia reproducing apparatus with consideration of the user's preference. Further, any multimedia files not preferred by the user should be selected and played less frequently than other multimedia files.

SUMMARY OF THE INVENTION

The present invention is conceived to meet the aforementioned needs. Therefore, it is an object of the present invention to provide a method and apparatus for playing multimedia files, wherein desired multimedia files can be played more frequently than undesired multimedia files according to a user's preference.

According to an aspect of the present invention for achieving the object, an apparatus for playing multimedia files comprises a memory for storing one or more multimedia files and selection information useful for considering a user's preferences; and a control unit for selecting and playing randomly selected multimedia files according to the stored selection information.

Preferably, the selection information includes the number of times a fast forward operation is performed while a particular multimedia file is played.

Preferably, the control unit includes a random selection processing unit for randomly selecting any one of the multimedia files according to selection weighting ratios of the multimedia files calculated from the selection information; and a multimedia file reproduction unit for playing the multimedia file selected by the random selection processing unit and for updating the selection information of the currently selected multimedia file and then playing another multimedia file when a fast forward button is pressed while the currently selected multimedia file is played.

More preferably, the random selection processing unit includes a weighting factor processing unit for calculating the selection weighting ratios of the respective multimedia files using the selection information; and a random selection unit for randomly selecting any one of the multimedia files stored in the memory accordingly to the applied selection weighting ratios.

According to another aspect of the present invention, a method of reproducing multimedia files is provided, comprising calculating selection weighting ratios of multimedia files based on user selection information to adjust selection probability of the multimedia files in accordance with the user's preference; randomly selecting a certain multimedia file according to the calculated selection weighting ratios; and playing the selected multimedia file.

Preferably, reproducing the selected multimedia file comprises reproducing the selected multimedia file and updating the selection information of the multimedia files when a fast forward operation is performed while the selected multimedia file is reproduced.

BRIEF DESCRIPTION OF THE DRAWINGS

The above and other objects, features and advantages of the present invention will become apparent from the following description of a preferred embodiment given in conjunction with the accompanying drawings, in which:

FIG. 1 is a schematic block diagram illustrating the configuration of a multimedia reproducing apparatus according to an embodiment of the invention;

FIG. 2 is a block diagram illustrating the configuration of a control unit provided in the multimedia reproducing apparatus according to an embodiment of the invention;

FIG. 3 is a graph plotting a weighting factor calculated by a weighting factor processing unit shown in FIG. 2; and FIG. 4 is a flowchart illustrating the operation of the control unit provided in the multimedia reproducing apparatus according to an embodiment of the invention.

DETAILED DESCRIPTION OF THE INVENTION

FIG. 1 is a schematic block diagram illustrating a multimedia reproducing apparatus according to an embodiment of the invention. A multimedia reproducing apparatus 10 comprises a memory 100 for storing a program used to select and reproduce a multimedia file in accordance with the user's preference ('user random reproduction program'), a control unit 200 for reading and executing the program stored in the memory 100, a display unit 300 for providing a display screen, a key input unit 400 including a fast forward button (not shown), and a speaker 500.

The memory 100 stores the user random reproduction program and a variety of operation programs, one or more multimedia files to be played by the user random reproduction program, and selection information related to the multimedia files.

When a user presses the fast forward button provided in the input key unit 400 while a multimedia file is being played, the information corresponding to pressing the fast forward button is stored. The number of the fast forward button presses is summed and stored, as a value between 1 to 100, according to an embodiment of the present invention. However, the present invention is not limited thereto.

The control unit 200 controls the general operations of a multimedia reproducing apparatus and allows a multimedia file to be selected randomly using the selection information in accordance with the user random reproduction program. In addition, the control unit 200 plays the selected multimedia file and updates the selection information of the relevant multimedia file to allow another multimedia file to be selected if the fast forward button provided on the key input unit 400 is pressed while the multimedia file is reproduced.

The display unit 300 is a display device such as a liquid crystal display (LCD) and allows the progress of a program and/or the information on a multimedia file currently played to be displayed on a display screen (not shown) under the control of the control unit 200.

The key input unit 400 comprises play, pause and stop buttons, a fast forward button, and for providing function keys for performing a variety of functions and outputs key data to the control unit 200. At this time, the fast forward button (not shown) is provided to stop playing the randomly selected multimedia file and to play another multimedia file.

Further, the speaker 500 reproduces the audio signals of the multimedia file played by the control unit 200, and the microphone 600 provides analog audio signals to the control unit 200.

FIG. 2 is a block diagram illustrating the configuration of the control unit 200 provided in the multimedia reproducing apparatus 10 according to an embodiment of the invention. The control unit 200 comprises a random selection processing unit 210 for selecting a multimedia file considering the user's preference, and a multimedia file reproduction unit 220 for playing the selected multimedia file and detecting the user's preference for the selected multimedia file.

In order to select a multimedia file to be played considering the user's preference, the random selection processing unit 210 is composed of a weighting factor processing unit 211 for calculating a selection weighting ratio of the relevant multimedia file based on the selection information stored in the memory 100 and a random selection unit 212 for selecting a certain multimedia file through a random method to which the calculated selection weighting ratio is applied.

First, the weighting factor processing unit 211 calculates the selection weighting ratios of the multimedia files using the selection information stored in the memory 100.

The selection weighting ratio is calculated by multiplying the existing selection probability of the multimedia files (1/(number of files)) by the weighting factor calculated according to the selection information, to adjust the selection probability of the multimedia file.

Referring to FIG. 3, a graph from which the weighting factor is calculated according to the selection information of the relevant multimedia file is shown. The selection information X represents the number of times the fast forward button has been pressed according to an embodiment of the present invention, i.e. an integer between 1 and 100. The weighting factor Y is information inversely proportional to the selection information X, wherein Y is a real number between 0 and 1.

Therefore, if the selection information X is 20, indicating the fast forward button has been pressed 20 times for the particular multimedia file, the weighting factor Y for that multimedia file is calculated to be 0.8.

The weighting factor processing unit 211 calculates the selection weighting ratio for each multimedia file using the weighting factor Y calculated based on the selection information X.

For example, assume ten multimedia files, and selection information of 20 for one multimedia file ("A" multimedia file) and selection information of 80 for another multimedia file ("B" multimedia file) are stored in the memory 100.

First, the weighting factor processing unit 211 calculates the selection weighting ratio of the "A" multimedia file to be 8% by multiplying the weighting factor, i.e. 0.8, calculated based on the relevant selection information, 20, by the existing selection probability of the "A" multimedia file, 10%.

Then, the weighting factor processing unit 211 calculates the selection weighting ratio of the "B" multimedia file to be 2% by multiplying the weighting factor, i.e. 0.2, calculated based on the relevant selection information, i.e. 80, by the existing selection probability of the "B" multimedia file, i.e. 10%.

The selection weighting ratio of the "A" multimedia file, is 8%, and the selection weighting ratio of the "B" multimedia file, is 2% and both are below the normal selection probability, i.e. 10%, and each selection weighting ratio of the other multimedia files becomes 11.25%, i.e. (100-8-2)/8 and thus is increased above the previous selection probability, i.e. 10%.

On the other hand, the random selection unit 212 performs a random operation, to which the selection weighting ratio calculated by the weighting factor processing unit 211 is applied, to any one of the multimedia files stored in the memory 100 using the calculated selection weighting ratio.

Then, the multimedia file reproduction unit 220 plays the multimedia file randomly selected by the random selection unit 212 and controls the playing according to the key data inputted from the key input unit 400 while the selected multimedia file is played. Particularly, if the fast forward button is pressed, the multimedia file reproduction unit 220 causes the selection information stored in the memory 100 to be updated and another multimedia file to be played.

FIG. 4 is a flowchart illustrating the operation of the control unit 200 of FIG. 2. The random selection processing unit 210 causes the weighting factor processing unit 211 to calculate the selection weighting ratios of the multimedia files based on the selection information stored in the memory 100 (step S1).

The random selection unit 212 then selects any one of the multimedia files stored in the memory 100 through the random operation (step S2) according to the selection weighting ratios. Then, the multimedia file reproduction unit 220 starts to play the multimedia file selected in step S2 (step S3). The control unit 200 detects whether the playing of the selected multimedia file has been completed (step S4), and has upon completion, the control unit 200 performs step S2 again to select and play another multimedia file.

If the playing of the multimedia file has not been completed, the control unit 200 detects whether the fast forward button has been pressed (step S5). If it is determined in step S5 that the fast forward button has been pressed, the control unit 200 causes the multimedia file reproduction unit 220 to stop playing the selected multimedia file and to update the selection information of the selected multimedia file (step S7).

The control unit 200 repeats step S1 to again calculate the selection weighting factor using the updated selection information. Further, if it is determined in step S5 that the fast forward button has not been pressed, the control unit 200 detects whether the stop button provided on the input key unit 400 has been pressed (step S6). If the stop button has been pressed, the control unit 200 stops playing the selected multimedia file. If it is determined in step S6 that the stop button has not been pressed, step S4 is repeated to continuously play the relevant multimedia file.

The multimedia reproducing apparatus according to an illustration of the invention is embodied to provide a fast forward button that lowers the selection weighting ratio of a currently playing multimedia file. However, the present invention is not so limited and may provide other buttons to raise or lower the selection weighting ratio of a currently playing multimedia file.

According to the present invention, in order to play a multimedia file considering the user's preference, a method and apparatus are provided for playing multimedia files, wherein the probability of respective multimedia files being selected is adjusted using selection information stored according to the user's preference and a multimedia file is randomly selected and played through a method to which the adjusted probability is applied.

Accordingly, if an undesired multimedia file is played, a user can lower the selection probability of the that multimedia file by pressing a fast forward button to allow the selected multimedia file to be reproduced less frequently.

Further, if a desired multimedia file is played, the user can increase the selection probability of the relevant multimedia file by pressing another predetermined button to allow the relevant multimedia file to be reproduced more frequently.

Although the present invention has been described and illustrated in connection with the specific preferred embodiments, it will be readily understood by those skilled in the art that various modifications and changes can be made thereto without departing from the spirit and scope of the present invention defined by the appended claims.

What is claimed is:

1. An apparatus for reproducing multimedia files, the apparatus comprising:
    a memory for storing one or more multimedia files and selection information related to a skipping command; and
    a control unit for selecting and reproducing a multimedia file of the one or more stored multimedia files that is randomly selected according to the stored selection information, wherein the control unit comprises:
        a random selection processing unit for randomly selecting the multimedia file according to selection weighting ratios of the stored one or more multimedia files; and
        a multimedia file reproduction unit for reproducing the multimedia file selected by the random selection processing unit,
    wherein the random selection processing unit includes a weighting factor processing unit for calculating the selection weighting ratios of the stored one or more multimedia files using the stored selection information,
    wherein the stored selection information includes an integer number of times between 1 and 100 that the selected multimedia file is skipped while being played,
    wherein the weighting factor is inversely proportional to the selection information and is represented as a real number between 0 and 1, and
    wherein each skip of the selected multimedia file between the first and hundredth skip decreases the weighting factor by 0.01.

2. The apparatus of claim 1, wherein the selection information includes a number of times the selected multimedia file is skipped while being reproduced.

3. The apparatus of claim 2, wherein the selected multimedia file is skipped via an input received by a skipping input unit.

4. The apparatus of claim 1, wherein the selection information includes a number of times the selected multimedia file is selected to increase its probability of being reproduced.

5. The apparatus of claim 1, wherein the multimedia file reproduction unit is further for updating the stored selection information of the selected multimedia file and then selecting and reproducing another multimedia file of the one or more stored multimedia files when the selected multimedia file is skipped.

6. A method of reproducing multimedia files, the method comprising:
    calculating selection weighting ratios of multimedia files, via a random selection processing unit of a control unit, based on selection information related to a skipping command;
    randomly selecting a multimedia file of the multimedia files, via the random selection processing unit, according to the selection weighting ratios;
    reproducing the selected multimedia file via a multimedia file reproduction unit of the control unit; and
    randomly selecting another multimedia file via the random selection processing unit when the selected multimedia file is skipped while being reproduced,
    wherein the random selection processing unit includes a weighting factor processing unit for calculating the selection weighting ratios of the multimedia files using the selection information;
    wherein the selection information includes an integer number of times between 1 and 100 that the selected multimedia file is skipped while being played;
    wherein the weighting factor is inversely proportional to the selection information and is represented as a real number between 0 and 1; and
    wherein each skip of the selected multimedia file between the first and hundredth skip decreases the weighting factor by 0.01.

7. The method of claim 6, wherein the selection information includes a number of times the selected multimedia file is skipped while being reproduced.

8. The method of claim 7, wherein the selected multimedia file is skipped via an input received by a skipping input unit.

9. The method of claim 6, wherein the selection information includes a number of times the selected multimedia file is selected to increase its probability of being reproduced.

10. The method of claim 6, wherein reproducing the selected multimedia file comprises:
    updating the selection information of the selected multimedia file via the multimedia file reproduction unit when the selected multimedia file is skipped while being reproduced;
    updating the selection information of the selected multimedia file via the multimedia file reproduction unit when the selected multimedia file is selected to increase its probability of being reproduced; and
    reproducing the another multimedia file via the multimedia file reproduction unit.

11. An apparatus for reproducing multimedia files, the apparatus comprising:
    a memory for storing one or more multimedia files and selection information related a skipping command; and
    a control unit for selecting and reproducing a multimedia file of the one or more stored multimedia files that is randomly selected according to the stored selection information, wherein the control unit comprises:
        a random selection processing unit for randomly selecting the multimedia file according to multimedia file selection weighting ratios, and
        a multimedia file reproduction unit for reproducing the selected multimedia file, for updating the stored selection information related to the selected multimedia file, and for selecting and reproducing another multimedia file of the one or more stored multimedia files when the selected multimedia file is skipped, wherein the selection information includes a number of times the selected multimedia file is skipped while being reproduced, wherein the selection information includes a number of times the selected multimedia file is selected to increase its probability of being reproduced, wherein the random selection processing unit includes a weighting factor processing unit for calculating the multimedia file selection weighting ratios using the selection information, wherein the selection information includes an integer number of times between 1 and 100 that the selected multimedia file is skipped while being played;

wherein the weighting factor is inversely proportional to the selection information and is represented as a real number between 0 and 1; and wherein each skip of the selected multimedia file between the first and hundredth skip decreases the weighting factor by 0.01.

12. The apparatus of claim 11, wherein the selected multimedia file is skipped in response to input received via a fast forward function.

13. An apparatus for reproducing multimedia files, the apparatus comprising:
a memory for storing one or more multimedia files and selection information related to a skipping command; and
a control unit for selecting and reproducing a multimedia file of the one or more stored multimedia files that is randomly selected according to the stored selection information, the control unit comprising:
a random selection processing unit for randomly selecting the multimedia file according to selection weighting ratios of the one or more multimedia files,
wherein the stored selection information is updated when the selected multimedia file is skipped while being reproduced,
wherein the random selection processing unit includes a weighting factor processing unit for calculating the selection weighting ratios of the stored one or more multimedia files using the stored selection information;
wherein the stored selection information includes an integer number of times between 1 and 100 that the selected multimedia file is skipped while being played;
wherein the weighting factor is inversely proportional to the selection information and is represented as a real number between 0 and 1; and
wherein each skip of the selected multimedia file between the first and hundredth skip decreases the weighting factor by 0.01.

14. The apparatus of claim 13, wherein the selected multimedia file is skipped via an input received by a skipping input unit.

15. A method of reproducing multimedia files, the method comprising:
calculating selection weighting ratios of multimedia files, via a random selection processing unit of a control unit, based on selection information related to a skipping command, wherein the selection information includes a number of times a selected multimedia file is skipped while being reproduced;
randomly selecting a multimedia file of the multimedia files, via the random selection processing unit, according to the selection weighting ratios;
reproducing the selected multimedia file via a multimedia file reproduction unit of the control unit;

updating the selection information of the selected multimedia file, via the multimedia file reproduction unit, when the currently selected multimedia file is skipped while being reproduced or when the currently selected multimedia file is selected to increase its probability of being reproduced;

randomly selecting another multimedia file, via the random selection processing unit, when the selected multimedia file is skipped while being reproduced; and reproducing the another multimedia file via the multimedia file reproduction unit, wherein the random selection processing unit includes a weighting factor processing unit for calculating the selection weighting ratios of the multimedia files using the selection information, wherein the selection information includes an integer number of times between 1 and 100 that the selected multimedia file is skipped while being played, wherein the weighting factor is inversely proportional to the selection information and is represented as a real number between 0 and 1, and wherein each skip of the selected multimedia file between the first and hundredth skip decreases the weighting factor by 0.01.

16. The method of claim 15, wherein the selected multimedia file is skipped via an input received by a skipping input unit.

17. A method of reproducing multimedia files having selection weighted ratios based on selection information, the method comprising:
randomly selecting a multimedia file, via a random selection processing unit of a control unit, according to the selection weighting ratios;
reproducing the selected multimedia file via a multimedia file reproduction unit of the control unit;
receiving input, via a skipping input unit, to skip the reproduction of the selected multimedia file;
updating the selection information of the selected multimedia file, via a multimedia file reproduction unit, when the selected multimedia file is skipped while being reproduced;
storing the updated selection information in a memory;
randomly selecting another multimedia file, via the random selection processing unit, based on the updated selection information; and
reproducing the another multimedia file via the multimedia file reproduction unit,
wherein the random selection processing unit includes a weighting factor processing unit for calculating the selection weighting ratios of the multimedia files using the selection information,
wherein the selection information includes an integer number of times between 1 and 100 that the selected multimedia file is skipped while being played,
wherein the weighting factor is inversely proportional to the selection information and is represented as a real number between 0 and 1, and
wherein each skip of the selected multimedia file between the first and hundredth skip decreases the weighting factor by 0.01.

18. The apparatus of claim 13, wherein the selection information includes a number of times the selected multimedia file is selected to increase its probability of being reproduced.

* * * * *